Figure 1:
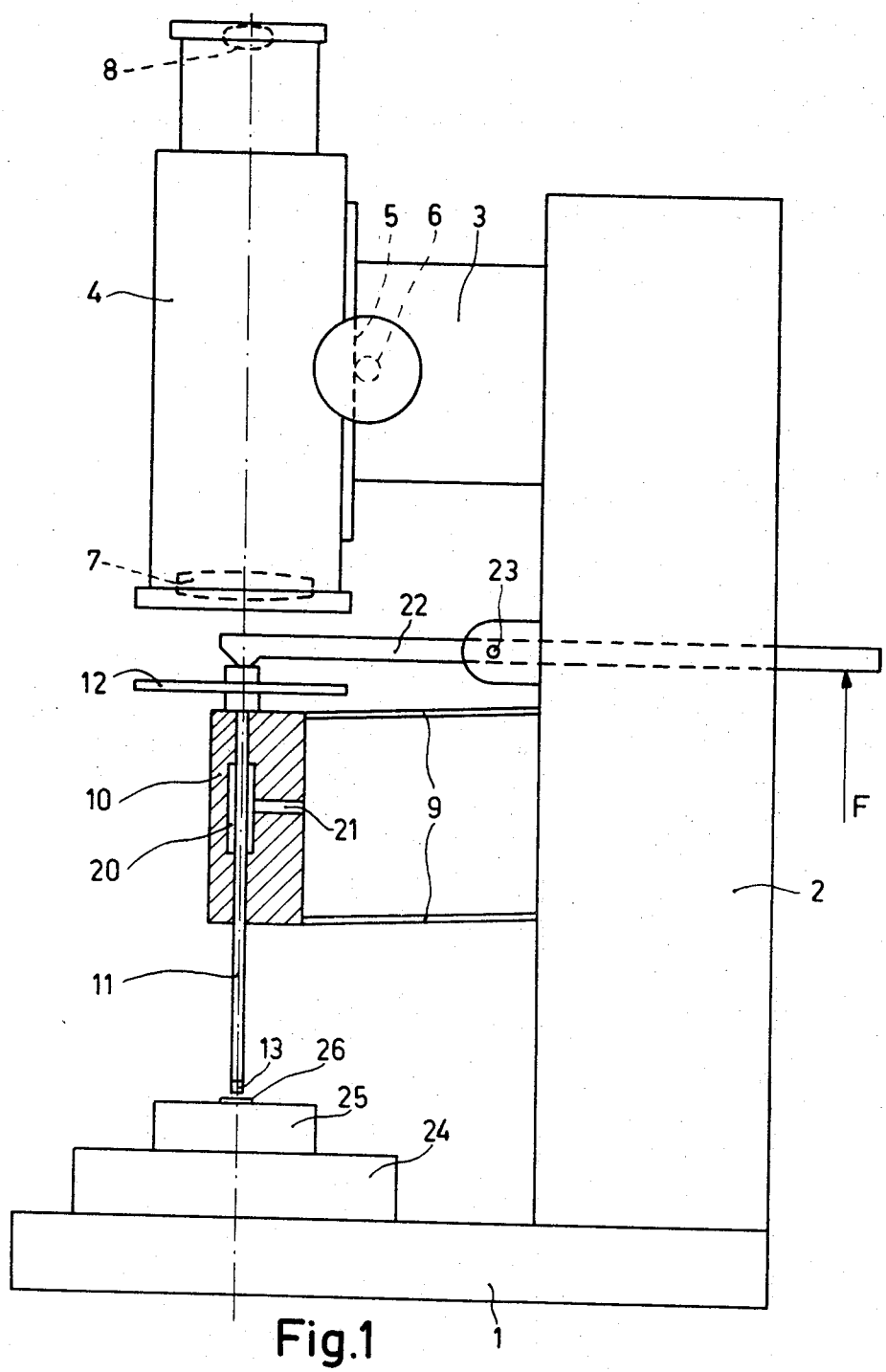

United States Patent [19]
Van Noord et al.

[11] 3,765,744
[45] Oct. 16, 1973

[54] MICROSCOPE AND TOOL FOR MECHANICALLY AND/OR ELECTRICALLY CONNECTING A SEMICONDUCTOR DEVICE TO A SUBSTRATE

[75] Inventors: Jacobus Adrianus Johannes Maria Van Noord; Leonard Henry Rapmund; Jan Mathieu Marie Tacken, all of Emmasingel, Eindhoven, Netherlands

[73] Assignee: U.S. Phillips Corporation, New York, N.Y.

[22] Filed: Oct. 1, 1971

[21] Appl. No.: 185,758

[30] Foreign Application Priority Data
Oct. 7, 1970  Netherlands....................... 7014698

[52] U.S. Cl...................... 350/81, 350/90, 350/244
[51] Int. Cl. ........................................... G02b 21/00
[58] Field of Search..................... 350/81, 243, 244, 350/90

[56] References Cited
UNITED STATES PATENTS

| | | | |
|---|---|---|---|
| 3,696,985 | 10/1972 | Herring et al..................... | 350/81 X |
| 3,575,333 | 4/1971 | Kulicke et al................ | 350/81 UX |
| 2,421,500 | 6/1947 | Haff............................. | 350/81 UX |
| 2,748,474 | 6/1956 | Brown............................ | 350/244 X |
| 1,800,209 | 4/1931 | Christopherson............. | 350/81 UX |
| 3,641,648 | 2/1972 | Kalberman..................... | 350/81 UX |
| 3,661,316 | 5/1972 | Kulicke et al................. | 350/81 UX |
| 3,615,138 | 10/1971 | Pedrotti et al.................. | 350/81 X |
| 2,075,856 | 4/1937 | Leitz............................. | 350/81 UX |

*Primary Examiner*—David H. Rubin
*Attorney*—Frank R. Trifari

[57] ABSTRACT

Device for mechanically and/or electrically connecting "beam leads" to current conductors on a substrate, said device comprising a support which supports a chisel holder with a chisel connected thereto, a support for the substrate, means to position the chisel relative to the support and a microscope which is arranged straight above the chisel, and the axis of which substantially coincides with the axis of the chisel holder, said microscope having a range of definition in depth which, during positioning, comprises both the lower surface of the chisel and the upper surface of the substrate, the support having a shape which passes the rays from the chisel to the microscope to a considerable extent or consisting of an optically translucent material, the chisel holder being present substantially entirely within the region occupied by said rays.

5 Claims, 7 Drawing Figures

INVENTORS
JACOBUS A.J.M. VAN NOORD
LEONARD H. RAPMUND
JAN M.M. TACKEN
BY

AGENT

MICROSCOPE AND TOOL FOR MECHANICALLY AND/OR ELECTRICALLY CONNECTING A SEMICONDUCTOR DEVICE TO A SUBSTRATE The invention relates to a device for mechanically and/or electrically connecting a semiconductor device comprising a semiconductor body and terminal leads which project laterally from the body, so-called "beam lead devices," to a substrate on which current conductors are present, said device comprising a first support which supports a chisel holder with a chisel connected thereto, a second support for the substrate, means to position the chisel relative to the second support, and a microscope to observe the positioning.

The connection of the terminal leads of the semiconductor device to current conductors of a substrate, or the performance of electric measurements in the semiconductor device by means of a measuring substrate which is provided with conductors leading to a measuring arrangement requires an accurate positioning of the "beam leads" relative to the substrate conductors. This positioning is carried out by means of one or more manipulators, the adjustment being checked by means of a microscope. For that purpose, in known devices a microscope is arranged beside the chisel holder; the axis of the microscope necessarily is inclined relative to the upper surface of the substrate and the lower surface of the chisel. In the case of direct observation of the outwardly projecting terminal leads present in the lower surface of the chisel, as well as of the substrate which is present at a comparatively small distance therefrom, the parallax will have to be taken into account so as to obtain a correct positioning. Furthermore, the side of the chisel remote from the microscope is not visible so that the terminal leads present at that region cannot be observed. This makes positioning very difficult.

In observing the positioning of the beam leads relative to the substrate conductors, it is possible to use a semi-transparent mirror which is arranged parallel to the substrate and to the plane through the terminal leads. The microscope is directed on the substrate conductors. The semi-transparent mirror also effects the simultaneous observation of the terminal leads, so that a positioning of the beam leads relative to the substrate becomes possible. The above-described drawbacks resulting from direct observation are not avoided. However, very high requirements are imposed upon the stability and the accuracy of adjustment of the semi-transparent mirror. The distance between the mirror and the substrate may be accurately equal to the distance between the mirror and the terminal leads. So the initial position of the chisel must be very accurately reproducible while the thicknesses of the various substrates to be used may show only extremely small mutual deviations. During the positioning, the distance between the substrate and the lower side of the chisel, must necessarily be rather large. The displacement of the chisel towards the substrate after positioning must be accurately in a straight line which, in the case of the larger distances to be covered, is far from easy.

It is the object of the invention to provide a device of the above-described type, in which the difficulties described are avoided and in which a favourable positioning is possible without this requiring difficult structural measures. In order to achieve this end, according to the invention, the microscope is arranged straight above the chisel and the axis of the chisel holder substantially coincides with the axis of the microscope, the microscope having a range of definition in depth which, during positioning, comprises both the lower surface of the chisel and the upper surface of the substrate, the support having a shape which passes the rays from the chisel to the microscope to a considerable extent, the chisel holder being located substantially entirely within the region occupied by the rays.

The invention enables a direct observation of the positioning and the connection, in which the drawbacks of the parallax cannot occur and the circumference of the chisel with the projecting leads is fully visible. The observation is not interrupted throughout the process. The shape of the support passes most of the rays of the microscope in an unhindered manner, and the choice of the construction of the support is still free within wide limits. For accurately performing the positioning, the device need not comprise means which are difficult to adjust, for example a semi-transparent mirror. Since the chisel during positioning is close above the substrate — both the lower surface of the chisel with the terminal leads of the semiconductor device present in that plane and the upper surface of the substrate, must all the same be present in the range of definition in depth i.e., the depth of field of the microscope — a displacement in a truly straight line of the chisel to the substrate can simply be realized.

Both a monocular and a stereo microscope may be used.

In an embodiment which is favourable particularly for a stereo microscope, the chisel holder support has a cross-section in the form of an E, the chisel holder being incorporated in the central limb of the E and the ends of the outermost limbs being connected by a closing plate, the recesses present between the three limbs of the E as well as the end face of the central limb extending obliquely in the direction of the chisel to obtain a free passage for rays to the microscope. On the one hand, this shape enables a large rigidity of the support. On the other hand, the rays directed towards the microscope come in a space which is screened for lateral light so that only very little loss of contrast occurs.

According to another embodiment the chisel holder is journalled in the support so as to be rotatable. A mutual rotation of the parts to be positioned can be obtained in a simple and elegant manner.

In a preferred embodiment according to the invention, the chisel and the chisel holder consist of two separate parts, the connection surface of the chisel to the chisel holder being spherical and the center of the sphere being present in the lower surface of th chisel, the chisel bearing against the connection surface of the chisel holder under the influence of a resilient element incorporated in the chisel holder.

When the chisel is moved downwards towards the substrate, its lower surface automatically adjusts parallel to the substrate surface. As a result of the chosen spherical shape and the location of the center, no movement of the semiconductor device occurs, so that the mutual positioning of terminal leads and substrate conductors is not influenced by the adjustment of the chisel.

In a further embodiment according to the invention, the chisel consists of an electrically insulating material or is covered with an insulating material. This embodiment is particularly suitable for the electric measurement of the semiconductor device by means of a measuring substrate. The chisel may consist, for example, of a ceramic material or of anodized aluminium.

Figure 2:
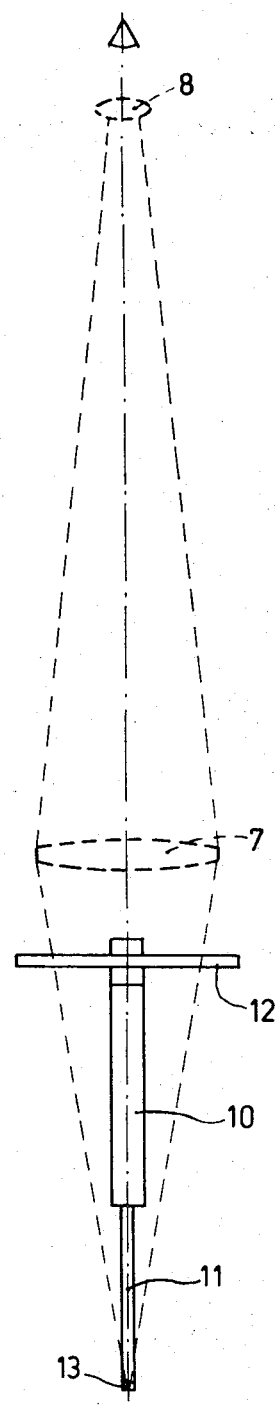
Figure 3:
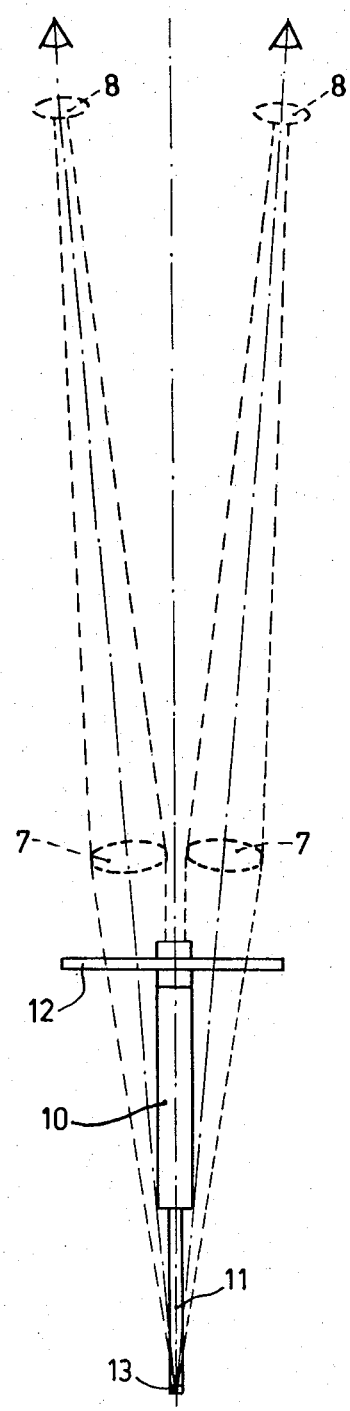
Figure 4:
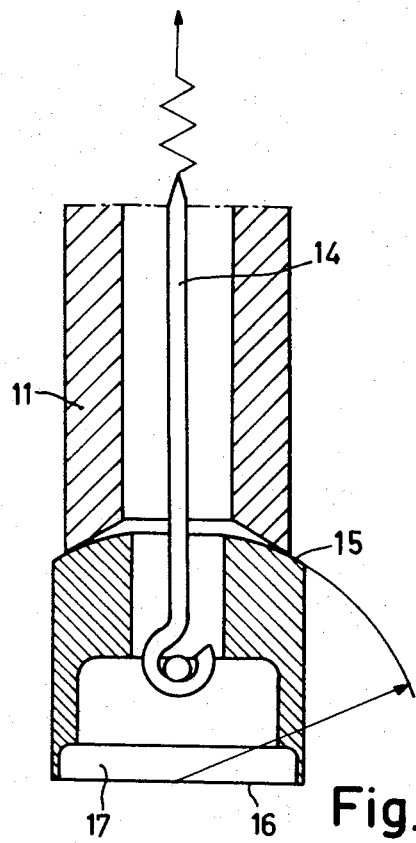
Figure 6:
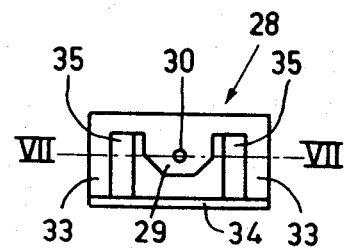
Figure 7:
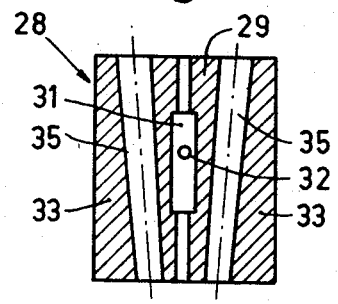
Figure 5:
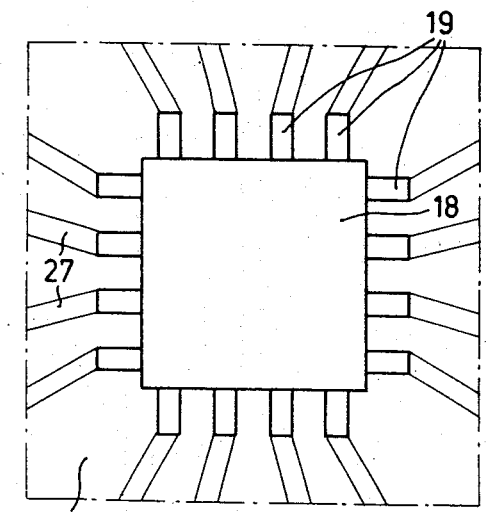

In order that the invention may be readily carried into effect, it will now be described in greater detail by way of example, with reference to the embodiment shown in the drawings, in which FIG. 1 is a diagrammatic representation of the device according to the invention, FIG. 2 shows the path of rays when a monocular microscope is used, FIG. 3 shows the path of rays when a stereo microscope is used, FIG. 4 shows a part of the chisel holder with the chisel, FIG. 5 shows a semiconductor device arranged on a substrate, FIG. 6 is a plan view of a further embodiment of a support for the chisel holder and FIG. 7 is a sectional view of said support taken on the line VII—VII of FIG. 6.

FIG. 1 is a diagrammatic representation of the device according to the invention. A column 2 is secured on a base plate 1. An arm 3 of the column 2 supports a microscope 4. The microscope can be adjusted in the direction of height and an adjustment of height by means of a rack-and-pinion construction 5,6 is shown by way of example. The objective 7 and the eye-piece 8 are shown in broken lines.

A support 10 is connected to the column 2 by means of leaf springs 9. The cross-section of the support 10 shown by way of example in FIGS. 1 to 3 is rectangular. A chisel holder 11 is incorporated in the support 10, the axis of the chisel holder coinciding with the axis of the microscope. The chisel holder 11 is journalled in the support so as to be rotatable, for example, by means of sliding or ball bearings. A wheel 12, for example, a toothed wheel, is secured on the upper side to the chisel holder and can be rotated by means of a pinion not shown so as to obtain a desirable angular adjustment of the chisel holder. The wheel 12 may be a spoke wheel or may consist of an optically translucent material, for example glass, so that it impedes the path of rays of the microscope only in a negligible manner, or does not impede said path of rays at all.

On the lower side of the chisel holder 11, a chisel 13 is secured so as to be adjustable. The chisel is drawn against the chisel holder with a small power by means of a spring 14 (FIG. 4), one end of the spring being secured to the chisel and the other end (not shown) being secured to the chisel holder. The connection surface 15 of the chisel which bears against the chisel holder is spherical, the center of the sphere being present on the lower surface 16 of the chisel. A recess 17 is provided in the chisel in which recess a semiconductor device in the form of a semiconductor body 18 (FIG. 5) with terminal leads 19 projecting beyond the body can be incorporated. Such a semi-conductor device is known as a "beam lead device." The terminal leads 19 have such a length that they can project beyond the chisel 13 in the lower surface 16. The semiconductor body 18 is held in the chisel 13 by means of negative pressure. For that purpose, the chisel holder is partly hollow and comprises an aperture at the height of the support, which aperture adjoins an annular space 20 in the support 10. A duct 21 connected to a source of negative pressure (not shown), adjoins the space 20.

On the upper side of the chisel holder bears one end of a lever 22 which is coupled to the column 2 by means of a hinge 23. The other end of the lever is movable in a vertical direction through means not shown. The chisel holder 11 can be moved in the direction of the base plate 1, by means of the lever 22, the leaf springs 9 ensuring a truly parallel guide.

A manipulator 24 which ensures an adjustment of the supporting plate 25 in two mutually perpendicular directions is present on the base plate 1, on which supporting plate 25 a substrate 26 (such as that shown in FIG. 5) can be placed. The supporting plate 25 can be heated so as to heat the substrate 26 at the desirable temperature during the mechanical connection of the terminal leads 19 to current conductors 27 present on the substrate 26.

The path of rays of the microscope is shown in FIGS. 2 and 3. FIG. 2 shows a monocular microscope and FIG. 3 shows a stereo microscope. The shape of the support is chosen to be so (in FIGS. 1, 2 and 3 in a cross-sectional view a longitudinal narrow rectangle) that a considerable part of the rays passes from the chisel to the objective without being interrupted by the support 10, so that the terminal leads of the semiconductor device incorporated in the chisel can be readily observed. The microscope has such a range of definition in depth i.e., depth of field, that the substrate conductors 27 can also be clearly observed. This is also possible since, during positioning, the distance between the semiconductor device and the substrate need only be small. The direct observation by means of the microscope enables a simple performance of the positioning of the terminal leads 19 relative to the current conductors 27, the manipulator 24 ensuring the adjustment in two mutually perpendicular directions, and the correct annular adjustment of the semiconductor device relative to the substrate being obtained by means of the rotatable wheel 12. After the positioning, the chisel 13 is moved towards the substrate by means of the lever 22, the leaf springs 9 ensuring a truly rectilinear movement also as a result of the small distance to be covered.

When the lower surface 16 of the chisel is not truly parallel to the substrate surface, the chisel can rotate about its spherical connection surface 15 until all the terminal leads 19 engage the substrate conductors 27. As a result of the choice of the fulcrum of the chisel, the semiconductor device is not moved laterally relative to the substrate conductors.

The terminal leads can now be connected to the current conductors of the substrate by means of thermocompression bonding, the supporting plate 25 being heated. The value of the pressure can be adjusted by means of the controllable force F on the lever 22. The terminal leads of the substrate may also be connected to a measuring arrangement, in which only an electric contact is made between the terminal leads and the substrate conductors, so as to test the semiconductor device.

It will be obvious that variations of the device described are possible without departing from the scope of this invention. For example, the guide need not consist of leaf springs, but any suitable straight-line guide may be used. The chisel holder may also be arranged so as to be fixed, the substrate moving towards the chisel holder, while the angular adjustment may also be imparted to the substrate. The axes of the microscope and the chisel holder coincide so as to avoid parallax.

A small distance between said axes is permissible, however, and does not influence the accuracy of positioning.

Other shapes of the support may also be chosen of which FIGS. 6 and 7 show an example. The support 28 shown in these Figures is E-shaped in plan view. In the central limb 29 of the E, the chisel holder is incorporated in an aperture 30. A space 31 is also present which can be made to communicate with the source of negative pressure via a duct 32. The function of the space 31 and the duct 32 is the same as described with reference to FIG. 1 with respect to space 20 and duct 21. A closing plate 34 is secured to the two outermost limbs 33 of the E. In this manner a space is formed which is screened for lateral light as a result of which loss of contrast of the microscope is counteracted.

The recesses 35 between the three limbs of the E extend obliquely as is clearly shown in FIG. 7. The end of the limb 29 may also extend obliquely. In this manner an unhindered passage of the most important part of the rays from the chisel to the microscope through the support is realized. The support shown in FIGS. 6 and 7 is particularly favourable when a stereo microscope is used.

What is claimed is:

1. An apparatus for connecting a semiconductor device comprising a semiconductor body and terminal leads which project laterally from said body, to a substrate on which current conductors are present, said apparatus comprising a first support member, a chisel holder supported by said first support member, a substantially opaque chisel element connected to said chisel holder, said chisel element and said chisel holder consisting of two separate parts and defining a spherical connection surface therebetween, the center of the sphere being in the lower surface of said chisel element, said apparatus further comprising a resilient element located within said chisel holder and urging said chisel element against said connection surface of said chisel holder, said chisel element being constructed to receive and hold the semiconductor device such that its terminal leads project laterally beyond the chisel element boundaries, a second support member for supporting said substrate, means for positioning said chisel element with respect to said second support member, a microscope for observing said positioning, and means for moving said first support member, chisel holder, and chisel element substantially axially toward said second support member and for maintaining said chisel element in contact with all of said terminal leads during said connecting operation, said microscope being located above said chisel holder so that the microscope optical axis substantially coincides with the axis of said chisel holder, said microscope having a field whose depth includes both the lower surface of said chisel element and the upper surface of said substrate, said chisel holder being located entirely within said field of said microscope and said chisel holder and said first support member having respective cross-sectional areas occupying less than the total area of said field, whereby all the projecting leads of the device are observable through the microscope when the device body is held by the chisel element.

2. An apparatus as defined in claim 1, wherein said chisel holder is journalled in said first support member so as to be rotatable.

3. An apparatus as recited in claim 1, wherein said chisel element consists of an electrically insulating material.

4. An apparatus as recited in claim 1, wherein said chisel element comprises a cover of electrically insulating material.

5. An apparatus as recited in claim 1, wherein said first support member has a cross-section substantially in the form of an E, said chisel holder being incorporated in the central limb of said E-shaped first support member and the ends of the outermost limbs thereof being connected by a closing plate, the recesses present between the three limbs of said first support member and the end face of said central limb extending obliquely in the direction of said chisel to define a passage for rays to said microscope.

* * * * *

PO-1050
(5/69)

UNITED STATES PATENT OFFICE
CERTIFICATE OF CORRECTION

Patent No. 3,765,744    Dated    October 16, 1973

Inventor(s) JACOBUS A.J.M. VAN NOORD ET AL

It is certified that error appears in the above-identified patent and that said Letters Patent are hereby corrected as shown below:

In the Title Page Section [73] change "Phillips" to

--Philips--.

Signed and sealed this 9th day of April 1974.

(SEAL)
Attest:

EDWARD M.FLETCHER,JR.         C. MARSHALL DANN
Attesting Officer             Commissioner of Patents